(12) United States Patent
Fritz et al.

(10) Patent No.: US 9,879,840 B2
(45) Date of Patent: Jan. 30, 2018

(54) LIGHT GUIDE FOR A VEHICLE LIGHTING UNIT

(71) Applicant: SMR Patents S.à.r.l., Luxembourg (LU)

(72) Inventors: Daniel Fritz, Stuttgart (DE); Heiko Hoeber, Esslingen (DE)

(73) Assignee: SMR PATENTS S.A.R.L., Luxembourg (LU)

( * ) Notice: Subject to any disclaimer, the term of this patent is extended or adjusted under 35 U.S.C. 154(b) by 0 days.

(21) Appl. No.: 15/313,319

(22) PCT Filed: May 8, 2015

(86) PCT No.: PCT/IB2015/053371
§ 371 (c)(1),
(2) Date: Nov. 22, 2016

(87) PCT Pub. No.: WO2015/177671
PCT Pub. Date: Nov. 26, 2015

(65) Prior Publication Data
US 2017/0097135 A1 Apr. 6, 2017

(30) Foreign Application Priority Data
May 22, 2014 (EP) .................................... 14169528

(51) Int. Cl.
*F21S 8/10* (2006.01)
*B29D 11/00* (2006.01)
(Continued)

(52) U.S. Cl.
CPC .... *F21S 48/2231* (2013.01); *B29D 11/00721* (2013.01); *B60Q 1/30* (2013.01);
(Continued)

(58) Field of Classification Search
CPC ................ F21S 48/2231; F21S 48/215; B29D 11/00721; B60Q 1/03
See application file for complete search history.

(56) References Cited

U.S. PATENT DOCUMENTS 9,182,531 B2    11/2015   Brick et al.

FOREIGN PATENT DOCUMENTS

DE    102007035021 A1    1/2009
DE    102010018028 A1    10/2011
(Continued)

OTHER PUBLICATIONS

PCT International Search Report and the Written Opinion, Application No. PCT/IB2015/053371 filed May 8, 2015 dated Jul. 22, 2015.

*Primary Examiner* — Joseph L Williams
(74) *Attorney, Agent, or Firm* — MacMillan, Sobanski & Todd, LLC

(57) ABSTRACT

The invention relates to a light guide for a vehicle lighting unit, having at least one light-conducting body, which conducts the light along at least one light direction; and at least one, in particular band-shaped, optically active flat material which interacts with the light guided into the body in order to produce a light effect. The light guide according to the invention is characterized in that the flat material with its longitudinal extension direction along the direction of light of the light-conducting body in the light-conducting body is completely surrounded and embedded by the same at least transversely to the direction of longitudinal extent.

15 Claims, 3 Drawing Sheets

(51) Int. Cl.
    *B60Q 1/30*           (2006.01)
    *F21Y 115/10*       (2016.01)
    *B29K 69/00*        (2006.01)
    *B29K 33/00*        (2006.01)

(52) U.S. Cl.
    CPC ......... *F21S 48/215* (2013.01); *B29K 2033/12* (2013.01); *B29K 2069/00* (2013.01); *B29K 2995/0026* (2013.01); *F21Y 2115/10* (2016.08)

(56) References Cited

FOREIGN PATENT DOCUMENTS

| | | |
|---|---|---|
| DE | 202011051503 U1 | 12/2011 |
| DE | 102011103200 A1 | 12/2012 |
| DE | 102011106595 A1 | 12/2012 |
| EP | 2450726 A1 | 5/2012 |

LIGHT GUIDE FOR A VEHICLE LIGHTING UNIT

CROSS-REFERENCE TO RELATED APPLICATIONS

This application is the National Phase of International Application PCT/IB2015/053371 filed May 8, 2015 which designated the U.S. and that International Application was published on Nov. 26, 2015 as International Publication Number WO 2015/177671 A1. PCT/IB2015/053371 claims priority to European Patent Application No. 14169528.8, filed May 22, 2014. Thus, the subject nonprovisional application claims priority to European Patent Application No. 14169528.8, filed May 22, 2014. The disclosures of both applications are incorporated herein by reference in their entirety.

BACKGROUND OF THE INVENTION

The invention relates to a light guide for a vehicle lighting unit, particularly for a motor vehicle, a rear view device comprising such a light guide, a method for producing such a light guide, and a motor vehicle having such a rear view device and/or such a light guide.

Various types of vehicle lighting units are known from the prior art, such as indicators, headlights and taillights, fog lights, etc. Conventional indicators are installed at the front or at the rear of the vehicle. Other embodiments of indicators are integrated in the outside mirrors. These additional indicators fulfill a safety function and enhance the vehicle from an aesthetic point of view. LEDs (light emitting diodes) and, to an increasing extent, light guide structures made of plexiglass are used for the mirror indicators.

A light guide not of the type in question is known from DD 20 2011 051 503 U1 where a flat material is disposed transverse to the light direction.

In addition, light guides not of the type in question are known from EP 2 450 726 A1 and DE 10 2010 018 028 A1; these do not comprise an optically effective flat material but a reflection unit is formed from a plurality of microparticles.

DE 10 2011 103 200 discloses a light window for signal lamps, particularly for indicators in outside mirrors using an optical film. The optical film is molded with a coating on one side, wherein the coating forms a light guide. The optical film comprises decoupling structures for decoupling the light from the light guide. The light window is produced in a single injection molding step in which the coating is molded onto the film. The film can have a protective layer on the hollow form side to prevent the film from damage during injection molding.

When designing indicators and other types of vehicle lighting units, it is not just functionality but also quality and aesthetic appearance that must be taken into account. It is therefore desirable to provide a simple manufacturing method for producing light guides for vehicle lighting units which decouple light efficiently and have an esthetically pleasing design at the same time.

Thus, it would be desirable to provide a light guide for a vehicle lighting unit which provides suitable decoupling of light and is also easy to produce.

SUMMARY OF THE INVENTION

The invention is based on the finding that light is refracted and reflected at the interface of two media having different refractive indices. If a flat material is embedded in a light conducting body that has a refractive index different from that of the flat material, two interfaces are obtained where the light is refracted and reflected. This light effect can not just be used to decouple the light from the light conducting body but it also gives the light guide produced in this way a three-dimensional depth effect. A flat material embedded in a light conducting body is particularly robust because its two surfaces are protected by the light conducting body and are not exposed to the environment. Thus, a various number of structures can be realized on the flat material which efficiently decouple the light and give the impression of a high-quality design due to the three-dimensional optical effect. The light guide is easy to produce if double or multiple back molding is used as manufacturing process. By means of multiple back molding, it is also possible producing light guides where multiple flat materials are embedded in the light conducting body, thereby further increasing the amount of area of the reflecting and refractive interface.

The description below also describes inter alia manufacturing method which has a process step of back molding a flat material or flat material back molding. In the flat material back molding process, a flat material that may have an imprint is preformed, for example in a thermoforming process. This flat material is then inserted in an injection molding tool and back molded with a plastic material. Injection molding is a primary forming process used in plastics processing. The respective material is liquefied in an injection molding machine and injected under pressure into an injection mold, the injection molding tool. The material becomes solid again in the mold by cooling or via a crosslinking reaction and can be removed as a finished part after the mold is opened. The hollow space of the mold defines the shape and the surface structure of the finished part.

The invention provides a light guide for a vehicle lighting unit having at least one light conducting body that conducts light along at least one light direction; and having at least one, particularly band-shaped, optically effective flat material which interacts with the light guided into the body to produce a light effect. It is characterized in that the flat material is embedded with its longitudinal extension direction along the direction of light of the light conducting body in the light conducting body and completely surrounded by the same, at least transversely to its longitudinal extension direction.

The advantage of such a light guide is that the light that is conducted along the intended direction of light interacts with the flat material, due to the different structures of flat material and light conducting body, hence producing a perceivable light effect. The advantage of the embedded flat material is that the decoupling of light from the light guide is improved because two surfaces are available at which the light is reflected and refracted. Furthermore, a wearing effect is reduced in a light guide with an embedded flat material since it is shielded from environmental influences. Furthermore, such an embedded structure can easily be produced by double or multiple back molding.

According to one embodiment, the flat material comprises at least one projection, particularly multiple projections, transversely to the longitudinal extension direction, such as an imprint, particularly a three-dimensional imprint. In addition, the at least one projection may comprise an embossing. The advantage of an imprint is that it is easy to produce before the flat material is embedded in the light conducting body. The imprint can be designed flexibly, for example, it can be a logo of the manufacturer or of another person. In addition, or alternatively, the projection can be configured such that it efficiently decouples the light conducted through the body, for example along a predetermined emission face, to comply with road traffic regulations or to give the light guide a specific characteristic.

The flat material can comprise a film.

According to one embodiment, the light effect comprises a three-dimensional depth effect. Such a three-dimensional depth effect is particularly striking, catches the eye, and gives the products into which the light guide is integrated an impression of high value. At the same time, a particularly pronounced depth effect shows high refraction of the light at the flat material and thus efficient decoupling from the light guide.

According to one embodiment, the light effect is associated with a decoupling of the light from the light conducting body. The advantage of the decoupling the light from the light conducting body is that the light guide can be used for illumination. Depending on the configuration of the flat material, a different light effect occurs which is connected with another emission characteristic of the light guide. The emission characteristic can thus be varied by specific structuring or specific imprinting of the flat material. This means that the light guide can be flexibly used with various types of light sources in various vehicle types and models.

According to one embodiment, the flat material and the light conducting body have a different refractive index, in particular, the flat material is designed to be transparent, semi-transparent and/or opaque. The advantage of the different refractive index is that thereby different emission characteristics, lighting impressions, and lighting effects can be achieved in a targeted manner. The appearance of the light guide varies depending on the appearance of the flat material. The light guide can therefore be flexibly used for various types of lighting.

According to one embodiment, the flat material is centrally attached to the light conducting body. This has the advantage that the production, for example using an injection molding process, is simplified because the first injection molding process step can be performed exactly like the second injection molding process step. In addition, a central arrangement of the flat material has a specific symmetry effect, such that the light passes approximately evenly through the transparent body on both sides of the flat material.

According to one embodiment, the light conducting body comprises an injection molded body onto which is injected the flat material, particularly by multiple flat material back molding. The advantage of this is that the light guide can be produced very easily and efficiently using the injection molding process. In case of double or multiple flat material back molding a very robust injection molded body results that can conduct the light into the desired direction.

According to one embodiment, the flat material comprises at least one continuous recess extending transversely to the longitudinal extension direction, through which recess the light from one side of the light guide can get to the other side of the light guide and/or to the outside. The advantage of the recess is that thereby a particularly efficient mixing of the light conducted through the light guide, so that the light emitted to the outside is particularly homogeneous. In addition, various light sources, e.g. light sources of different colors, can be mixed efficiently wherewith, thus giving the impression of a uniform light source.

According to one embodiment, the flat material is configured to homogenize the light conducted through the body. This has the advantage that it makes the impression of a homogeneous, even light source, and the emitted light effects a particularly good lighting of the illuminated objects. An indicator or a taillight of a vehicle can therefore be particularly easily recognized, or a driver can easily identify illuminated objects, particularly in the dark, when using such a light source as headlight.

According to one embodiment, the light conducting body has an oblong form and the direction of light extends along a main axis of the body. The advantage of the oblong form is that the body can be configured as a light guide band and can therefore be attached to various places in the vehicle, such as at the outside mirror, on the rear window, or on front or rear indicators in the vehicle. When the direction of light is along the main axis of the body, the light conducting body is well illuminated so that the distribution of the light is uniform and appears as homogeneous illuminated area viewed from outside.

According to one embodiment, the light conducting body is designed as rod or disc-shaped, particularly disc-shaped and curved. This has the advantage that the light conducting body is suitable for use in any type of motor vehicle lighting, such as indicators, lenses, e.g. lenses made of ASA (acrylic ester—styrene—acrylonitrile) plastic, light guide modules in a vehicle, e.g. light guide modules for BSM (blind spot monitoring), etc. The advantage of a curved design is that the light conducting body is particularly suitable for use in motor vehicles because most shapes there are curved, either for design reasons or because of technical necessity, for example due to optimal flow properties and low $c_d$ value.

According to one embodiment, the light conducting body has an end surface that is adjacent to a component unit of the light source, wherein the flat material is disposed at a spacing from said end surface. This has the advantage that the end surface can separate the space for electrical components from the optical components and thus prevent interference. The spacing has the advantage that light that can be generated in the component unit can be coupled from the component unit into the light guide in a suitable manner before the light passes through two substantially separate optical channels which result from the partition provided by the flat material in the light conducting body.

According to one embodiment, the light conducting body is shielded from view at the end surface, particularly by a second flat material and/or plastic housing attached to the end surface.

This has the advantage that those components of the component unit can be closed opaquely by the end surface, so that their contours are not mirrored in the light guide and thus will not disturb the appearance or impact the optical path of the light adversely. A second flat material can easily be attached to the end surface, for example be glued onto it. A plastic housing can be made on the opaque plastic material, for example through simple injection molding processes, wherein various other devices can be located in the plastic housing simultaneously, for example for holding components or for inserting the light source that feeds light into the light guide.

In addition, the object is achieved by a 13 rear view device for a motor vehicle, having at least one light guide, particularly having at least one of the features mentioned above, which comprises at least one light conducting body which conducts light along at least one direction of light; and which comprises at least one, particularly band-shaped, optically effective flat material that interacts with the light conducted in the body to produce a light effect, and that is characterized in that the flat material is embedded with its longitudinal extension direction along the direction of light of the light conducting body in the light conducting body and completely surrounded by the same, at least transversely to its longitudinal extension direction.

Furthermore, the invention also provides a method for producing a light guide for a vehicle lighting unit, having the following process steps: Provision of a flat material having a first surface and a second surface facing in opposite direction; back injection of the first surface of the flat material with transparent injection molding material; and back injection of the second surface of the flat material with the transparent injection molding material, wherein the flat material together with the injection molding material are molded to a light guide which conducts light along an intended direction of light.

Such a production method has the advantage that it can be realized with simple process steps on common injection molding equipment. The method is based on a dual back molding process, i.e. a back molding of a first surface and a back molding of a second surface of a flat material. The product produced in this manner is characterized by particular robustness and easy handling. For example, it can simply be grasped by a robot arm in manufacturing, wherein the robot arm does not need particular dexterity.

According to one embodiment, dual back molding process fully embeds the flat material in the transparent injection molding material. This has the advantage that each component produced in this way has the same optical properties. The flat material is thus protected from environmental influences and can also have very complex texturing, which is protected in the injection molding material from abrasion and weather conditions.

Finally, the invention provides a motor vehicle with at least one rear view device, particularly having at least one of the features mentioned above, and/or with at least one light guide, particularly having at least one of the features mentioned above.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
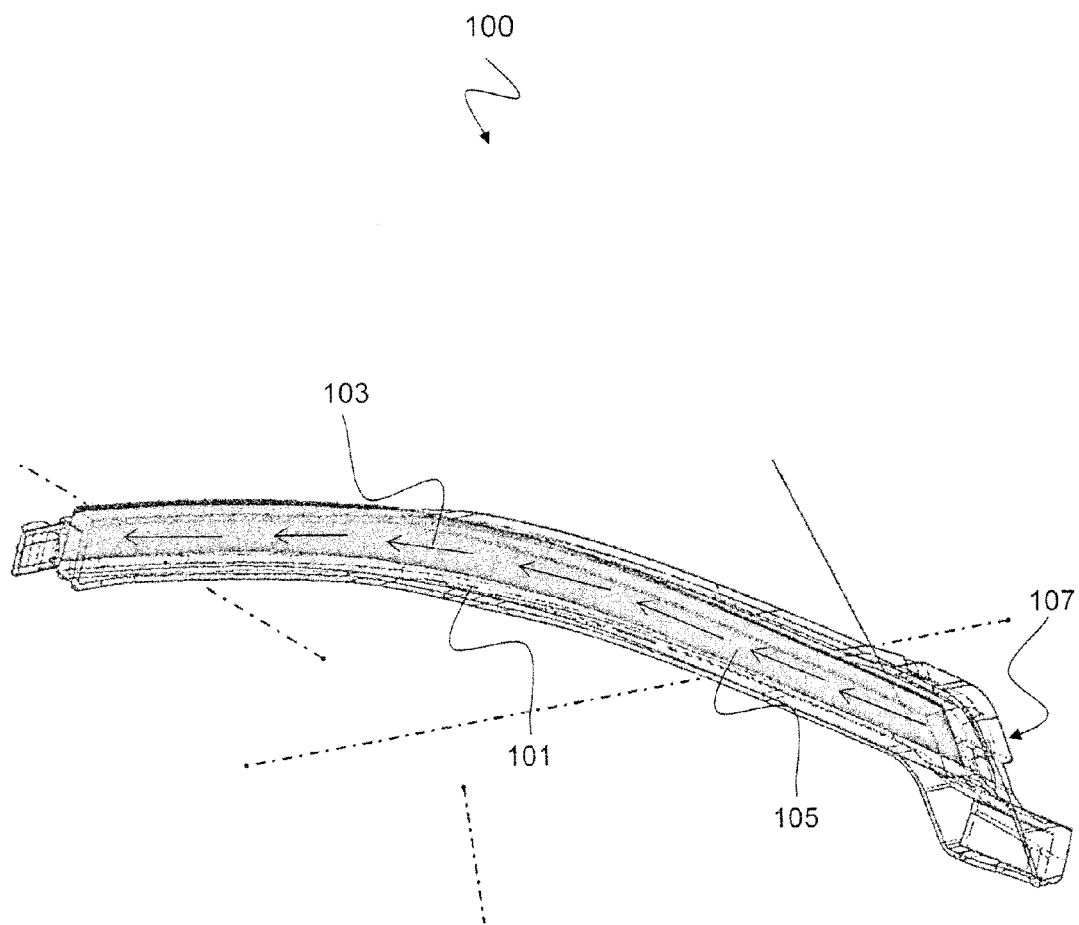
FIG. 1 is a perspective top view of a light guide for a lighting unit in an outside mirror of a vehicle according to one embodiment.

FIG. 1 shows a three-dimensional design drawing of a light guide half with incorporated flat material 105 of a light guide 100 for a lighting unit in an outside mirror of a vehicle according to one embodiment in top view.

The light guide 100 comprises a light conducting body 101 and a flat material 105 embedded in the body 101, in which the flat material is completely surrounded by the body 101 transversely to its longitudinal extension direction. FIG. 1 shows a half of the light guide 100 onto which the flat material 105 is injected. The light conducting body 101 conducts light along a direction of light described by the arrows 103. The light conducting body 101 is injected onto the flat material along the direction of light 103. The direction of light 103 is the same as the longitudinal extension direction of the flat material 105. A second half, which is not shown in FIG. 1, can be deposited onto the first half, for example in another injection molding process as described below in FIG. 3 to produce the complete light guide 100. The flat material 105 interacts with the light conducted into the body 101 to produce a light effect. The light effect can be a three-dimensional depth effect. The light effect produced by the flat material is associated with a decoupling of the light from the light conducting body 101. The light passes through the body 101, for example from a coupling on the right side of the body 101, and is decoupled from the transparent body 101 depending on the flat material 105 and its properties while passing through the body 101. In order to produce a suitable light effect or to achieve good decoupling of the light from the body 101, the flat material 105 can be provided with an imprint, such as a three-dimensional imprint. The flat material 105 and the light conducting body 101 can have a different refractive index, for example, be made of different materials, in order to create the three-dimensional light effect shown in FIG. 1. For example, the flat material 105 can be transparent, semi-transparent, or opaque. The flat material 105 can be centrally attached in the light conducting body 101, as shown in FIG. 1. FIG. 1 shows that the flat material 105 is embedded in the light conducting body 101 along the direction of light 103.

The light conducting body 101 can for example be formed as an injection molded body that is injected onto the flat material 105, for example using a multiple flat material back molding process as described below with reference to FIG. 3.

The flat material 105 can comprise recesses (not shown in FIG. 1) through which the light from one side of the light guide 100 can get to another side of the light guide 100 and/or to the outside. The flat material 105 can comprise suitable windows or holes or three-dimensional structures at which the light is reflected and/or refracted for homogenizing the light conducted through the body 101.

The light guide 100 can be used for a lighting unit in an outside mirror of a vehicle. Therefore, it has an oblong shape, and the direction of light 103 extends along a main axis of the body. The light conducting body 101 can particularly be disc-shaped so that it can be used for a lighting unit of a motor vehicle. FIG. 1 shows that the body 101 is disc-shaped and curved to adapt to the outside mirror of a motor vehicle.

On its right side, which is shown in FIG. 1, the light conducting body 101 comprises an end surface 107 that is adjacent to a component unit (not shown) in which an insert for a light source can be provided for coupling light into the light guide. The flat material 105 is attached at a spacing from the end surface 107 which is visible in FIG. 1. The end surface 107 can be shielded from view, for example by a second flat material attached to the end surface 107 or a plastic housing. The components will then not be visible from outside and cannot interfere with the light effect that results from embedding the flat material in the light conducting body.

The light conducting body 101 can for example be made of a transparent, cost-effective plastic material, such as polycarbonate or PMMA.

The light guide 100 can be used in a lighting unit in an outside mirror of a vehicle, e.g. as a mirror indicator. The light guide 100 can be joined with an indicator housing to produce a mirror indicator. The joint which can be moisture-resistant, may enclose an installation space in which the light sources, e.g. one or several LEDs, as well as one or several PCBs, metalized regions for forming reflectors and light conducting structures, which can be connected to the light guide 100 or not, can be installed. The light guide 100, however, is not limited to mirror indicators or to indicators having a modular structure. The light guide 100 can advantageously be cost-effectively injection molded in a multiple (e.g. dual) back molding process.

Figure 2:
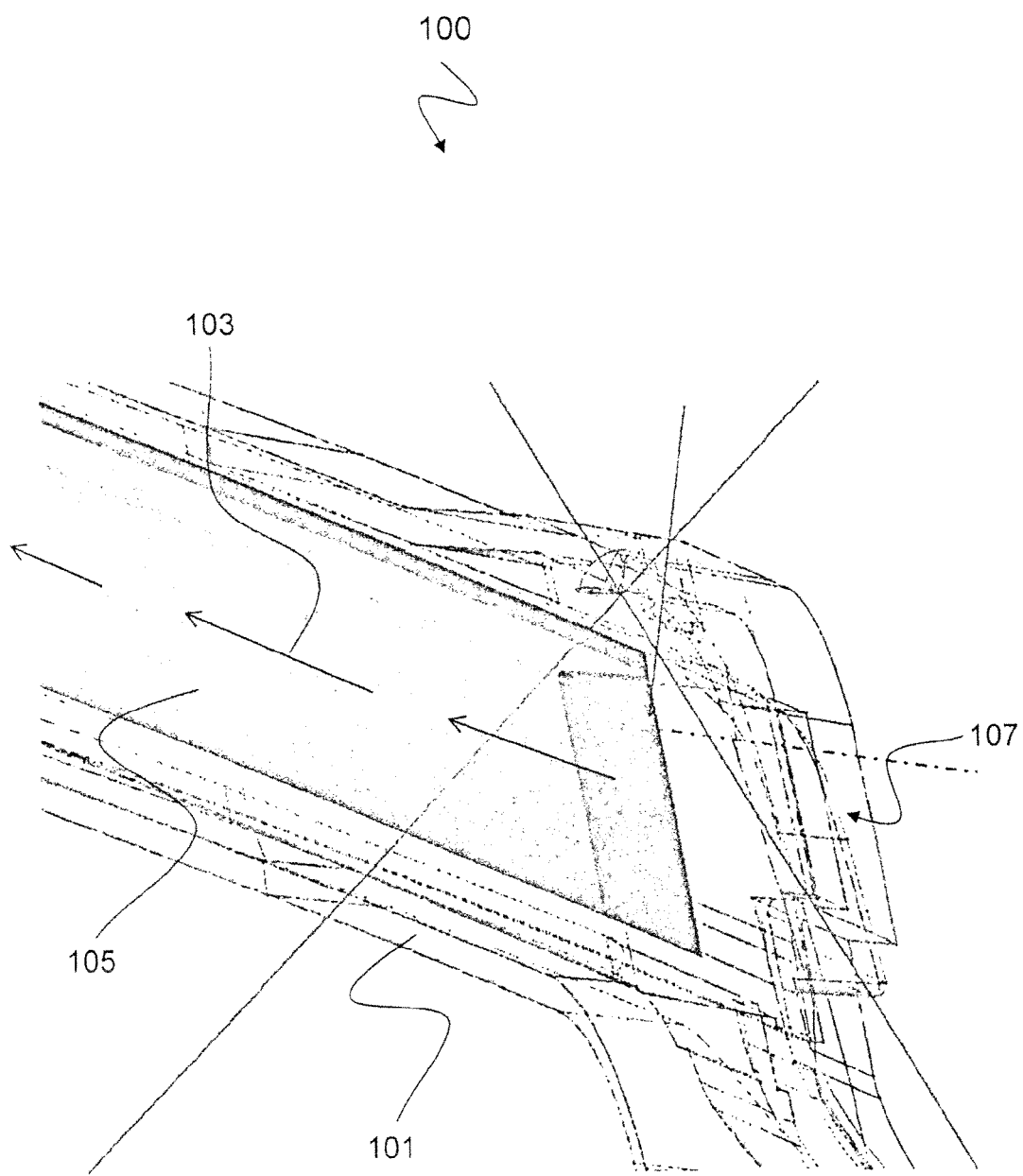
FIG. 2 is a detailed side view of the light guide according to FIG. 1.

FIG. 2 shows a section of the three-dimensional design drawing of the light guide 100 from FIG. 1 in a side view.

The light guide 100 comprises the light conducting body 101 and the flat material 105 embedded in the light conducting body 101. The central embedding of the flat material 105 in the body 101 is visible in this figure. The light conducting body 101 conducts light along the intended direction of light, which is described by the arrows 103. The flat material 105 is embedded along the direction of the light 103 in the light conducting body 101 and interacts with the light conducted in the body 101 to produce a light effect. The flat material 105 is at a spacing from the end surface 107. A holder for receiving light sources, e.g. one or several LEDs, can be provided in the end surface 107. The end surface 107 can be opaque to close off the components of the component unit from view.

FIGS. 3a) to 3d) are schematic views of each of the process steps 301, 302, 303, 304 of a manufacturing method of a light guide 100 for a vehicle lighting unit according to one embodiment.

In a first process step 301 the method comprises the provision 301 of a flat material 105, having a first surface 312 and a second surface 314 that faces in opposite direction. The flat material 105 can be a polycarbonate film, which can have the three-dimensional structure described in FIGS. 1 and 2. It can for example be printed with a colored ink and have a varying pattern to produce the light effect described.

In a second process step 302, the method comprises the back injection of the first surface 312 of the flat material 105 with a transparent injection molding material 313, such as a crystal clear plastic like polycarbonate or PMMA. The flat material 105 can be placed onto an injection molding carrier 309 for manufacturing and covered with the first injection mold 311a, which can correspond to the negative shape of the first side of the formed part. A first nozzle 315a can be used to fill forming material or injection molding material 313 into the first injection mold 311a in order to form the first side of the light conducting body 101, as described, for example, in FIGS. 1 and 2.

In a third process step 303, the method comprises back injection of the second surface 314 of the flat material 105 with the transparent injection molding material 313.

The injection molding carrier 309 can for this purpose be detached from the molded body of flat material 105 and cooled down injection molding material 313, and a second injection mold 311b, which can correspond to the negative shape of the second side of the molded body, can cover the molded body. A second nozzle 315a can be used to fill forming material or injection molding material 313 into the second injection mold 311b in order to form the second side of the light conducting body 101, as described, for example, in FIGS. 1 and 2.

After the injection molding material 313 has cooled down, a light guide 100 can be formed in a fourth process step 304, or as a result of the third process step 303, which light guide conducts light along an intended direction of light, as described in more detail in the introductory part and in the description of FIGS. 1 and 2. By this process, the flat material 105 can be completely embedded in the light conducting body 101.

The first nozzle 315a and the second nozzle 315b can be realized as a single nozzle. The first injection mold 311a and the second injection mold 311b can be realized as a single injection mold, for example, if a symmetrical structure of the light conducting body 101 is to be achieved.

In one embodiment of the method, the second and third process steps can be repeated multiple times to embed multiple flat materials in the light conducting body by means of multiple back injection.

Both the light conducting body 101 and the flat material 105 can have different colors to create colored light or to produce various color effects. The flat material can be imprinted with a logo, for example a manufacturer's note, such as a manufacturer's or car maker's trademark.

Figure 3:
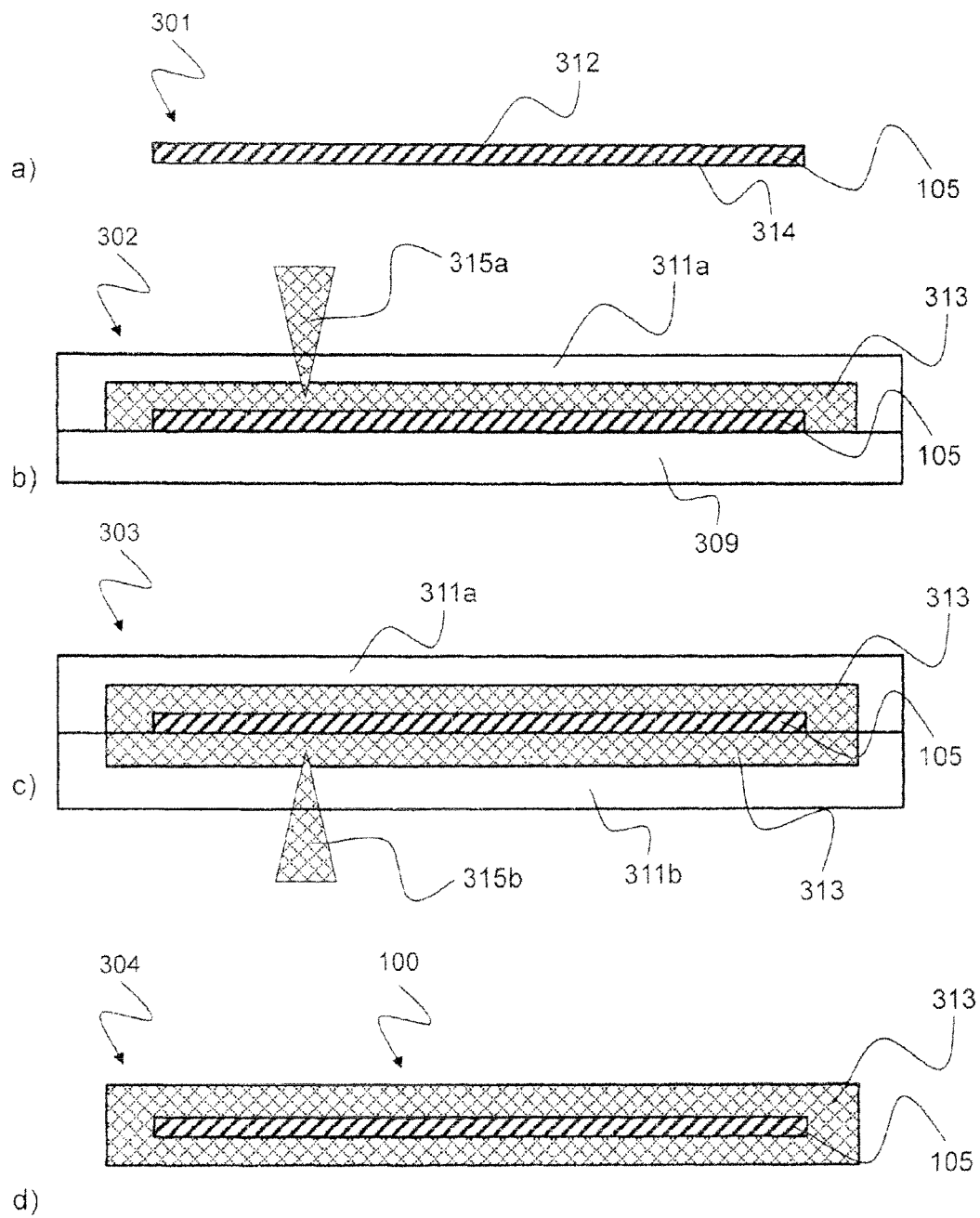
FIGS. 3a) to 3d) are schematic cross sectional views of each process step of a production method of a light guide for a vehicle lighting unit.

One aspect of the invention also comprises a computer program product which can be loaded directly into the internal memory of a digital computer and comprises software code sections by means of which the process steps 301, 302, 303, and 304 of the method described in FIG. 3 can be executed when the program is running on a computer. The computer program product can be stored on a computer-suitable medium and include the following: computer-readable program means, which cause a computer to provide a flat material 105 having a first surface 312 and a second surface 314 that faces in the opposite direction; to back inject the first surface 312 of the flat material 105 with a transparent injection molding material 313; to back inject the second surface 314 of the flat material 105 with a transparent injection molding material 313; and to mold the flat material 105 together with the injection molding material 313 to a light guide 100, which conducts light along an intended direction of light. The computer can be a control device that controls the injection molding processes, for example as part of a CNC machine. The computer can be configured as a chip, an ASIC, a microprocessor, or a signal processor and can be arranged in the control unit of an injection molding system.

It is self-evident that the features of the various exemplary embodiments described herein can be combined with one another unless specifically stated otherwise. As shown in the description and in the figures, individual elements shown to be connected do not have to be directly connected; intermediate elements can be provided between such connected elements. It is further self-evident that embodiments of the invention can be implemented in individual circuits, partially integrated circuits, or fully integrated circuits or programming means. The term "exemplary" is meant to denote an example, not the best or optimum. While specific embodiments were illustrated and described herein, it is obvious to a person skilled in the art that a multitude of alternative and/or similar implementations can be realized instead of the embodiments shown and described without deviating from the scope of the present invention.

The principle and mode of operation of this invention have been explained and illustrated in its preferred embodiment. However, it must be understood that this invention may be practiced otherwise than as specifically explained and illustrated without departing from its spirit or scope.

The invention claimed is:
1. A light guide for a vehicle lighting unit, comprising:
at least one light conducting body that conducts light along at least one direction of light; and comprising at least one, particularly band-shaped, optically effective flat material which interacts with the light conducted into the body to produce a light effect, wherein
the flat material is embedded with its longitudinal extension direction along the direction of light of the light conducting body in the light conducting body and completely surrounded by the same, at least transversely to its longitudinal extension direction.

2. The light guide according to claim 1, wherein the flat material comprises at least one projection, particularly multiple projections, transversely to the longitudinal extension direction, such as an imprint, particularly a three-dimensional imprint.

3. The light guide according to claim 1, wherein the flat material comprises a film and/or the light effect includes a three-dimensional depth effect.

4. The light guide according to claim 1, wherein the light effect comprises a decoupling of the light at least partially from the light conducting body (101).

5. The light guide according claim 1, wherein the flat material and the light conducting body have a different refractive index, particularly that the flat material is at least in sections transparent, semi-transparent, and/or opaque.

6. The light guide according to claim 1, wherein the flat material is centrally arranged in the light conducting body.

7. The light guide according to claim 1, wherein the light conducting body comprises an injection molded part that is injected onto the flat material, particularly by multiple flat material back molding.

8. The light guide according to claim 1, wherein the flat material comprises at least one continuous recess extending transversely to the longitudinal extension direction through which the light from one side of the light guide can get to another side of the light guide and/or to the outside.

9. The light guide according to claim 1, wherein the flat material is configured such that it homogenizes the light conducted through the body and/or the light conducting body has an oblong shape, and the direction of light extends along a main axis of the body.

10. The light guide according to claim 1, wherein the light conducting body is of a rod or disc-shaped, particularly disc-shaped and curved design.

11. The light guide according to claim 1, wherein the light conducting body has an end surface that is adjacent to a component unit of the light source, wherein the flat material is disposed at a spacing from the end surface.

12. The light guide according to claim 11, wherein the light conducting body is shielded from view at the end surface, particularly by a second flat material and/or a plastic housing attached to the end surface.

13. A rear view device of a motor vehicle, having at least one light guide according to claim 1 which comprises at least one light conducting body which conducts light along at least one direction of light; and which comprises at least one, particularly band-shaped, optically effective flat material that interacts with the light conducted in the body to produce a light effect, wherein
the flat material is embedded with its longitudinal extension direction along the direction of light of the light conducting body in the light conducting body and completely surrounded by the same, at least transversely to its longitudinal extension direction.

14. A method for producing a light guide for a vehicle lighting unit, comprising the following process steps:
providing a flat material, having a first surface and a second surface that faces in the opposite direction;
Back injecting the first surface of the flat material with a transparent injection molding material; and
Back injecting the second surface of the flat material with the transparent injection molding material, wherein the flat material together with the transparent injection molding material are molded to a light guide, which conducts light in an intended direction of light, wherein the steps of back injecting the first and second surfaces of the flat material fully embeds the flat material in the transparent injection molding material.

15. A motor vehicle having at least one rear view device according to claim 13 and/or having at least one light guide according to claim 1.

* * * * *